(12) United States Patent
Park et al.

(10) Patent No.: US 11,570,345 B2
(45) Date of Patent: Jan. 31, 2023

(54) CAMERA MODULE

(71) Applicant: SAMSUNG ELECTRO-MECHANICS CO., LTD., Suwon-si (KR)

(72) Inventors: Jae Man Park, Suwon-si (KR); Byung Woo Kang, Suwon-si (KR); Soo Cheol Lim, Suwon-si (KR); Jung Seok Lee, Suwon-si (KR); Jae Hyuk Lee, Suwon-si (KR); Byung Gi An, Suwon-si (KR); Yoo Chang Kim, Suwon-si (KR); Sung Hoon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/467,951

(22) Filed: Sep. 7, 2021

(65) Prior Publication Data

US 2022/0103731 A1    Mar. 31, 2022

(30) Foreign Application Priority Data

Sep. 25, 2020  (KR) .......................... 10-2020-0124398
Aug. 30, 2021  (KR) .......................... 10-2021-0115106

(51) Int. Cl.
*H04N 5/225* (2006.01)
*G02B 7/09* (2021.01)
*G02B 7/08* (2021.01)

(52) U.S. Cl.
CPC ............. *H04N 5/2257* (2013.01); *G02B 7/08* (2013.01); *G02B 7/09* (2013.01); *H04N 5/2254* (2013.01)

(58) Field of Classification Search
CPC .. H04N 5/2257; H04N 5/2254; H04N 5/2252; G02B 7/08; G02B 7/09; G02B 27/646
See application file for complete search history.

(56) References Cited

U.S. PATENT DOCUMENTS

| 10,054,759 | B2 * | 8/2018 | Kang ................... G02B 27/646 |
| 2016/0252702 | A1 * | 9/2016 | Tsuchiya .................. G03B 3/10 359/824 |
| 2017/0139225 | A1 * | 5/2017 | Lim ......................... G02B 7/08 |

(Continued)

FOREIGN PATENT DOCUMENTS

| KR | 10-2019-0002852 A | 1/2019 |
| KR | 10-2019-0142103 A | 12/2019 |
| KR | 10-2020-0016625 A | 2/2020 |

*Primary Examiner* — Padma Haliyur

(74) *Attorney, Agent, or Firm* — NSIP Law

(57) ABSTRACT

A camera module includes a housing having a first ball support surface disposed on an inner surface thereof, a driving body movably disposed in the housing and having a second ball support surface disposed on an outer surface thereof, and a plurality of ball bearings disposed between the first ball support surface of the housing and the second ball support surface of the driving body. A distance between the first ball support surface and the second ball support surface along a direction perpendicular to an optical axis direction is different at respective first end portions of the first ball support surface and the second ball support surface in the optical axis direction than at respective second end portions of the first ball support surface and the second ball support surface in the optical axis direction.

25 Claims, 13 Drawing Sheets

(56) References Cited

U.S. PATENT DOCUMENTS

| | | | |
|---|---|---|---|
| 2017/0205600 A1* | 7/2017 | Kim | H04N 5/2254 |
| 2017/0357077 A1* | 12/2017 | Kim | H02K 1/34 |
| 2018/0109660 A1* | 4/2018 | Yoon | G02B 13/0035 |
| 2018/0173081 A1* | 6/2018 | Kim | H04N 5/23212 |
| 2020/0050083 A1 | 2/2020 | Jeong et al. | |

* cited by examiner

CAMERA MODULE

CROSS-REFERENCE TO RELATED APPLICATION(S)

This application claims the benefit under 35 USC 119(a) of Korean Patent Application No. 10-2020-0124398 filed on Sep. 25, 2020 and 10-2021-0115106 filed on Aug. 30, 2021 in the Korean Intellectual Property Office, the entire disclosure of which is incorporated herein by reference for all purposes.

BACKGROUND

1. Field

The following description relates to a camera module.

2. Description of Background

Cameras have been standardly installed in portable electronic devices such as smartphones, table PCs, notebook computers, and the like, and an autofocusing function, an optical image stabilization function, a zoom function, and the like, are added to cameras for mobile terminals.

Meanwhile, a Ball Type Actuator is used as a Z-axis driving method for autofocusing (AF), and a driving body and a housing are supported by a plurality of main ball bearings and a plurality of auxiliary ball bearings.

However, there is a problem that tilt may occur in the driving body as the main ball bearing and the auxiliary ball bearing supporting the driving body are changed according to the operation of the main ball bearing and the auxiliary ball bearing supporting the driving body.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module preventing tilt from occurring in a driving body.

In one general aspect, a camera module includes: a housing having a first ball support surface disposed on an inner surface thereof, a driving body movably disposed in the housing and having a second ball support surface disposed on an outer surface thereof, and a plurality of ball bearings disposed between the first ball support surface of the housing and the second ball support surface of the driving body. A distance between the first ball support surface and the second ball support surface along a direction perpendicular to an optical axis direction is different at respective first end portions of the first ball support surface and the second ball support surface in the optical axis direction than at respective second end portions of the first ball support surface and the second ball support surface in the optical axis direction.

The second ball support surface may be inclined in the optical axis direction.

An inclination angle of the second ball support surface is within ±8.0'.

The first ball support surface may be inclined in the optical axis direction.

An inclination angle of the first ball support surface is within ±8.0'.

The first ball support surface may be stepped in the optical axis direction.

A step between stepped surfaces of the first ball support surface has a value of between 0.01 mm and 0.02 mm.

The second ball support surface may be stepped in the optical axis direction.

A step between stepped surfaces of the second ball support surface has a value of between 0.01 mm and 0.02 mm.

The first ball support surface may include a first main ball support surface and a first auxiliary ball support surface spaced apart from the first main ball support surface, and the second ball support surface may include a second main ball support surface disposed opposite the first main ball support surface to define a main rolling space and a second auxiliary ball support surface disposed opposite the first auxiliary ball support surface to define an auxiliary rolling space. The plurality of ball bearings may include a main ball bearing disposed in the main rolling space and an auxiliary ball bearing disposed in the auxiliary rolling space.

The auxiliary ball bearing may include a plurality of auxiliary ball bearings, and at least two of the auxiliary ball bearings may each be in contact with the first auxiliary ball support surface and the second auxiliary ball support surface at three points.

The at least two auxiliary ball bearings may each contact the first auxiliary ball support surface at one point, and may contact the second auxiliary ball support surface at two points.

The at least two auxiliary ball bearings may each contact the first auxiliary ball support surface at two points, and may contact the second auxiliary ball support surface at one point.

The main ball bearing may include a plurality of main ball bearings, and at least two of the main ball bearings may each be in contact with the first main ball support surface and the second main ball support surface at four points.

The first ball support surface and the second ball support surface forming the main ball rolling unit has a '∧' longitudinal cross-sectional shape, an inclination angle of the first ball support surface and the second ball support surface forming the main ball rolling unit is within ±8.0'.

The first ball support surface or the second ball support surface forming the auxiliary ball rolling unit has a '-' longitudinal cross-sectional shape, an inclination angle of the first ball support surface or the second ball support surface forming the auxiliary ball rolling unit has a value of between −8.0' and −23'.

The first ball support surface forming the auxiliary ball rolling unit has a '∧' longitudinal cross-sectional shape, when the first ball support surface forming the auxiliary ball rolling unit is formed to be stepped, a step between stepped surfaces of the first ball support surface forming the auxiliary ball rolling unit has a value of between 0.01 mm and 0.02 mm.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
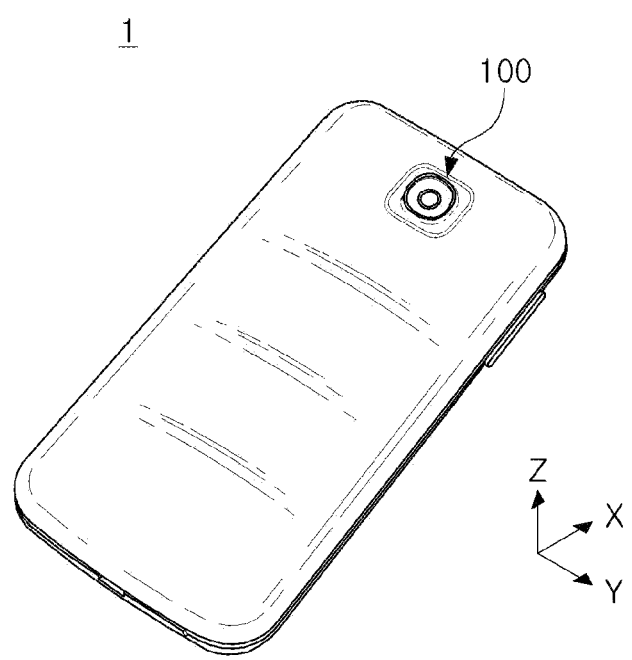
FIG. 1 is a perspective view of a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

FIG. 1 is a perspective view of a portable electronic device according to an example.

Referring to FIG. 1, a portable electronic device 1 may be a portable electronic device, such as a mobile communication terminal, a smartphone, a tablet PC, or the like, on which a camera module 100 is mounted.

As illustrated in FIG. 1, the camera module 100 is mounted on the portable electronic device 1 to image a subject.

The camera module 100 includes a plurality of lenses, and an optical axis of a lens may face in a direction, from a thickness direction (Z-axis direction, from a front surface of the portable electronic device toward a rear surface thereof or vice versa) of the portable electronic device 1.

The camera module 100 may have at least one of AF, zoom, and OIS functions. Accordingly, the plurality of lenses may be moved along the Z axis, an optical axis direction.

Figure 2:
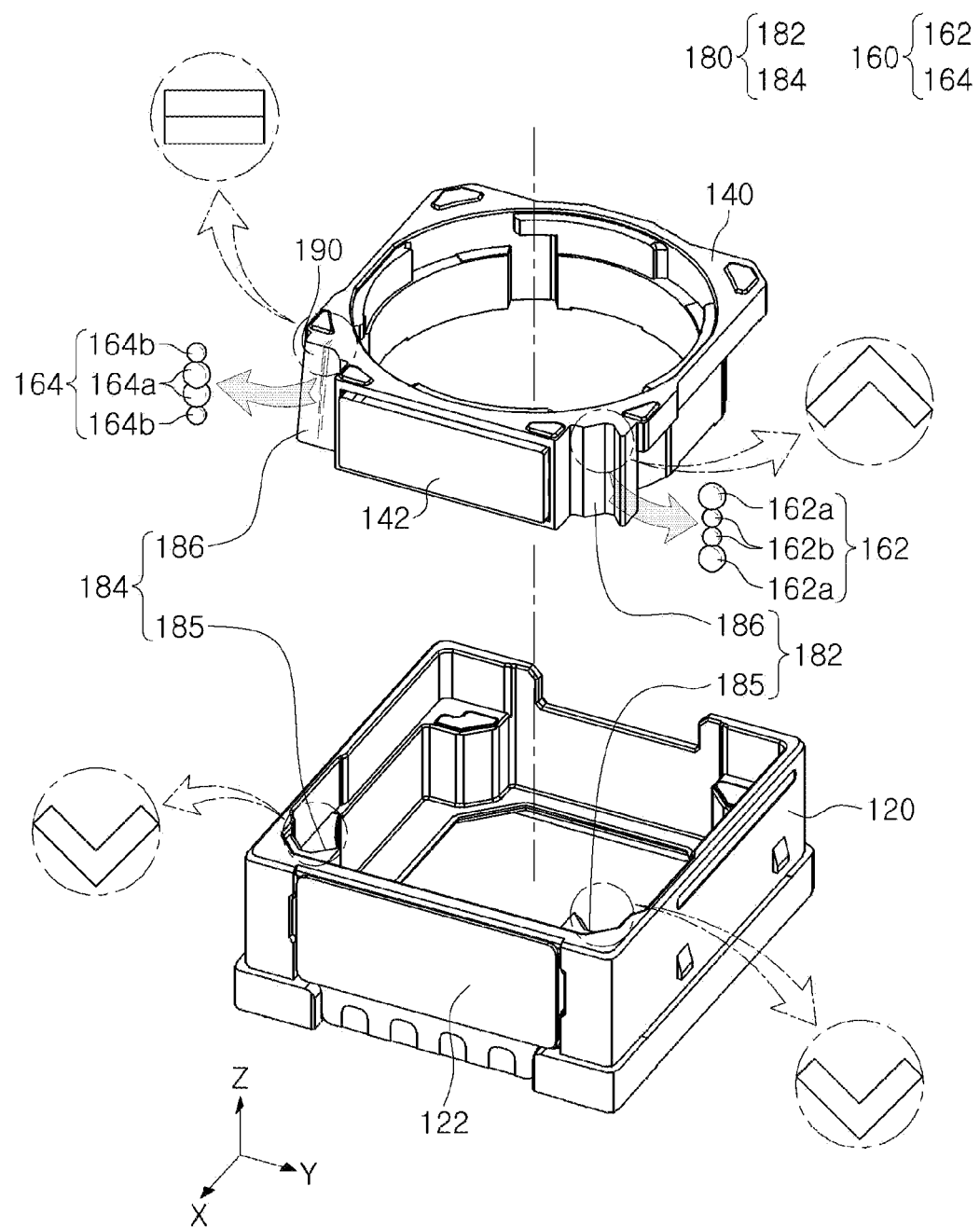
FIG. 2 is an exploded perspective view illustrating a housing, a driving body, and a ball bearing provided in a camera module according to an example.
Figure 3:
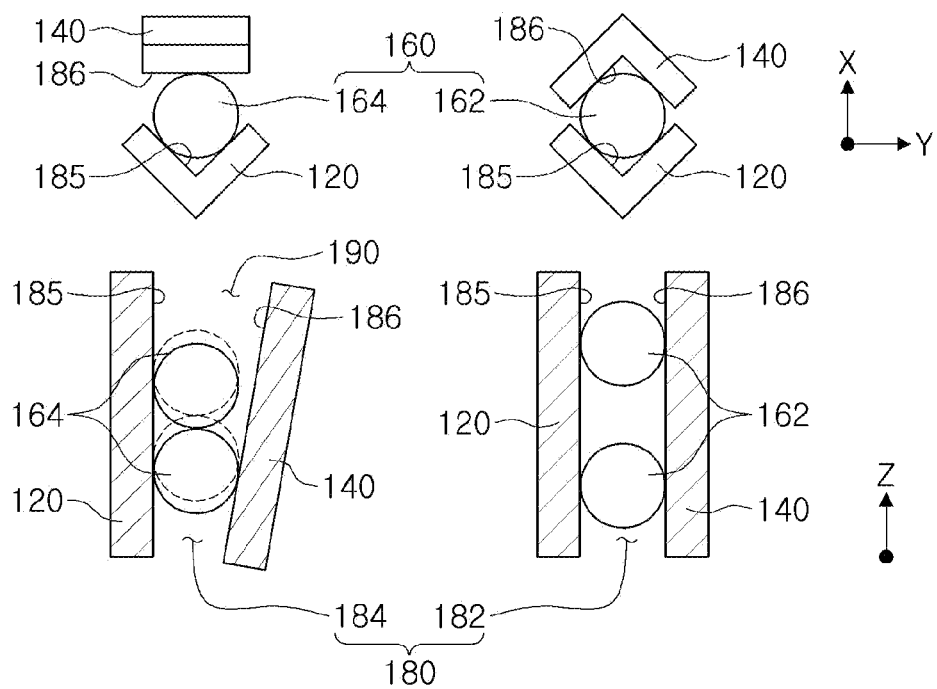
FIG. 3 is an explanatory diagram schematically illustrating a plan view and a cross-section of a ball rolling unit.

FIG. 2 is an exploded perspective view illustrating a housing, a driving body, and a ball bearing provided in a camera module according to an example, and FIG. 3 is an explanatory diagram schematically illustrating a plan view and a cross-section of a ball rolling unit.

Referring to FIGS. 2 and 3, the camera module 100 (see FIG. 1) may include a housing 120, a driving body 140, and a ball bearing 160.

The housing 120 has an internal space to accommodate the driving body 140. The housing 120 may have a hexahedral shape with six open upper and lower portions. In addition, the housing 120 and the driving body 140 form a ball rolling unit 180 on which the ball bearing 160 is installed. A detailed description of the ball rolling unit 180 will be described later. As an example, an AF coil 122 for elevating the driving body 140 may be provided on one surface of the housing 120.

The driving body 140 is installed to be elevated in the housing 120 and has a hollow so that a lens holder (not shown) can be installed. The driving body 140 may be provided with an AF magnet 142 disposed opposite to the AF coil 122. As described above, the driving body 140 may be elevated from the housing 120 by interaction between the AF coil 122 and the AF magnet 142. Meanwhile, a plurality of lenses (not shown) may be installed in the lens holder, and the plurality of lenses may be disposed to be stacked in a vertical direction of the driving body 140, that is, in the Z-axis direction of FIGS. 1 and 2.

A plurality of ball bearings 160 are supported by the ball rolling unit 180. The ball bearings 160 are disposed between the housing 120 and the driving body 140 to serve to smooth the movement of the driving body 140.

As an example, the ball bearings 160 may include a plurality of main ball bearings 162 disposed on one side of the housing 120 and the driving body 140, and auxiliary ball bearings 164 disposed to be spaced apart from the main ball bearings 162.

The main ball bearings 162 are disposed in parallel with the AF coil 122 and the AF magnet 142 in the optical axis direction on one side surface of the AF coil 122 and the AF magnet 142, and the auxiliary ball bearings 164 are disposed in parallel with the AF coil 122 and the AF magnet 142 in the optical axis direction on the other side surface of the AF coil 122 and the AF magnet 142.

As an example, the main ball bearings 162 and the auxiliary ball bearings 164 may be provided with two first ball bearings 162a and 164a and two second ball bearings 162b and 164b having a smaller size than that of the first ball bearings 162a and 164a, respectively.

However, the configuration is not limited thereto, and the second ball bearings 162b and 164b may not be provided, and the number of the second ball bearings 162b and 164b may be varied.

The ball rolling unit 180 is formed by an inner surface of the housing 120 and an outer surface of the driving body 140. As an example, the ball rolling unit 180 may include a main ball rolling unit 182 on which a main ball bearing 162 is installed, and an auxiliary ball rolling unit 184 on which an auxiliary ball bearing 164 is installed.

The ball rolling unit 180 may include a first ball support surface 185 provided in the housing 120, and a second ball support surface 186 disposed opposite to the first ball support surface 185 and provided in the driving body 140. The main ball rolling unit 182 and the auxiliary ball rolling unit 184 are formed by the first ball support surface 185 and the second ball support surface 186.

As an example, an interval formed by the first ball support surface 185 and the second ball support surface 186 in a direction perpendicular to an optical axis direction, is different between one end portion and the other end portion in the optical axis direction. In other words, the second ball support surface 186 of the auxiliary ball rolling unit 184 is formed to be inclined such that an interval with the first ball support surface 185 widens from one end portion to the other end portion in the optical axis direction (i.e., the Z-axis direction). That is, a contact avoidance unit 190 is formed in the ball rolling unit 180 to prevent a contact with at least one of the plurality of ball bearings 160. The contact avoidance unit 190 may be formed by an inclined surface.

Accordingly, the first ball bearing 164a of one of the auxiliary ball bearings 164 contacts at two points on the first ball support surface 185 of the auxiliary ball rolling unit 184 and contacts at one point on the second ball support surface 186 of the auxiliary ball rolling unit 184. As an example, the first ball support surface 185 of the auxiliary ball rolling unit 184 may have a longitudinal '∧' cross-sectional shape and an angle therebetween of 90 degrees, and the second ball support surface 186 may have a '-' longitudinal cross-sectional shape.

As an example, the main ball rolling unit 182 also has a first ball support surface 185 and a second ball support surface 186, and the first ball support surface 185 and the second ball support surface 186 of the main ball rolling unit 182 has a '∧' longitudinal cross-sectional shape and an angle therebetween of 90 degrees. Accordingly, the main ball bearing 162 is in contact with the main ball rolling unit 182 at four points.

As described above, since the ball bearing 160 supported by the first and second ball support surfaces 185 and 186 can be intentionally determined, driving of the camera module 100 according to a difference in disposition can be stabilized. In other words, since the ball bearing 160, in contact with the first and second ball support surfaces 185 and 186 may not change according to the difference in disposition of the camera module 100, a tilt phenomenon occurring in the driving body 140 can be prevented.

Figure 4:
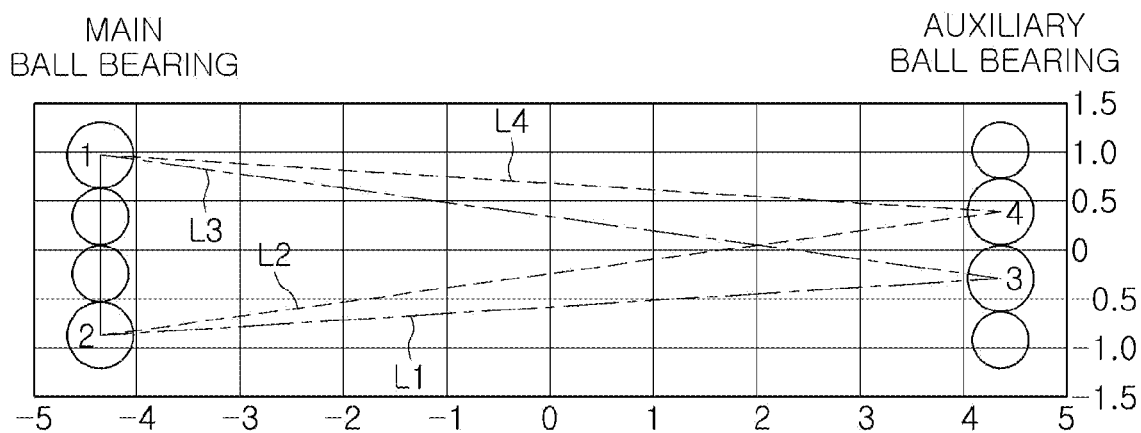
FIG. 4 is an explanatory diagram illustrating an action point of axial force between a housing and a driving body.

As shown in FIG. 4, an operating point of axial force between the housing and the driving body are located in support triangles of the first, second, and third ball bearings, such that driving is performed. However, when the fourth ball bearing instead of the third ball bearing comes into contact with the housing and the driving body, some operating points deviate from the ball support triangle, and a driving body tilt occurs as the supported ball bearing is changed.

However, as described above, since the contact avoidance unit 190 is provided in the auxiliary ball rolling unit 184, the operating point of axial force of the housing 120 and the driving body 140 is located within a support triangle of the first, second, and third ball bearings 160 so that driving may be performed.

Hereinafter, a modified example will be described with reference to the drawings. However, in the following drawings, a plan view of the ball rolling unit and a cross-sectional view of the ball rolling unit are schematically illustrated to describe the ball rolling unit.

Figure 5:
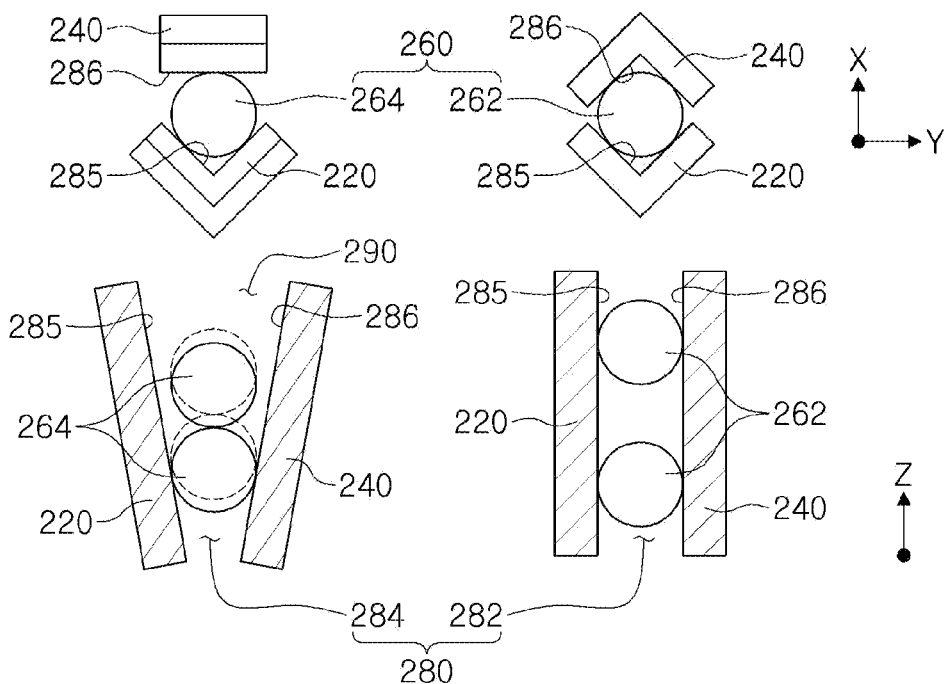
FIG. 5 is an explanatory diagram illustrating a first modified example of a ball rolling unit.

FIG. 5 is an explanatory diagram illustrating a first modified example of a ball rolling unit.

Referring to FIG. 5, a ball rolling unit 280 may include a main ball rolling unit 282 on which a main ball bearing 262 is installed, and an auxiliary ball rolling unit 284 on which an auxiliary ball bearing 264 is installed. A contact avoidance unit 290 having a wider interval in one end portion in the optical axis direction (i.e., Z-axis direction) is formed to prevent a contact with at least one of the plurality of ball bearings 260. The contact avoidance unit 290 may be formed by an inclined surface.

The ball rolling unit 280 may include a first ball support surface 285 provided in the housing 220, and a second ball support surface 286 disposed opposite to the first ball support surface 285 and provided in the driving body 240.

As an example, the first ball support surface 285 of the auxiliary ball rolling unit 284 is formed to be inclined so that an interval of the auxiliary ball rolling unit 184 with the second ball roll support surface 286 increases from one end portion to the other end portion in the optical axis direction (i.e., the Z axis direction). The second ball support surface 286 of the auxiliary ball rolling unit 284 is also formed to be inclined so that an interval of the auxiliary ball rolling unit 284 with the first ball support surface 285 increases from one end portion to the other end portion in the optical axis direction (i.e., the Z axis direction).

Accordingly, one of the auxiliary ball bearings 264 contacts at two points on the first ball support surface 285 of the auxiliary ball rolling unit 284 and contacts at one point on the second ball support surface 286 of the auxiliary ball rolling unit 284. As an example, the first ball support surface 285 of the auxiliary ball rolling unit 284 may have a '/\' longitudinal cross-sectional shape and an angle therebetween of 90 degrees, and the second ball support surface 286 of the auxiliary ball rolling unit 284 may have a '-' longitudinal (cross-sectional shape.

As an example, the main ball rolling unit 282 also has a first ball support surface 285 and a second ball support surface 286, and the first ball support surface 285 and the second ball support surface 286 of the main ball rolling unit 282 have a '/\' longitudinal cross-sectional shape and an angle therebetween of 90 degrees. Accordingly, the main ball bearing 262 is in contact with the main ball rolling unit 282 at four points.

As described above, since the ball bearings 260 supported by the first and second ball support surfaces 285 and 286 can be deliberately determined, it is possible to stabilize the driving of the camera module 100 (see FIG. 1) according to the difference in disposition. In other words, since the ball bearing 260, in contact with the ball rolling unit 280, may not be changed according to the difference in disposition of the camera module 100, a tilt phenomenon occurring in the driving body 240 can be prevented.

Figure 6:
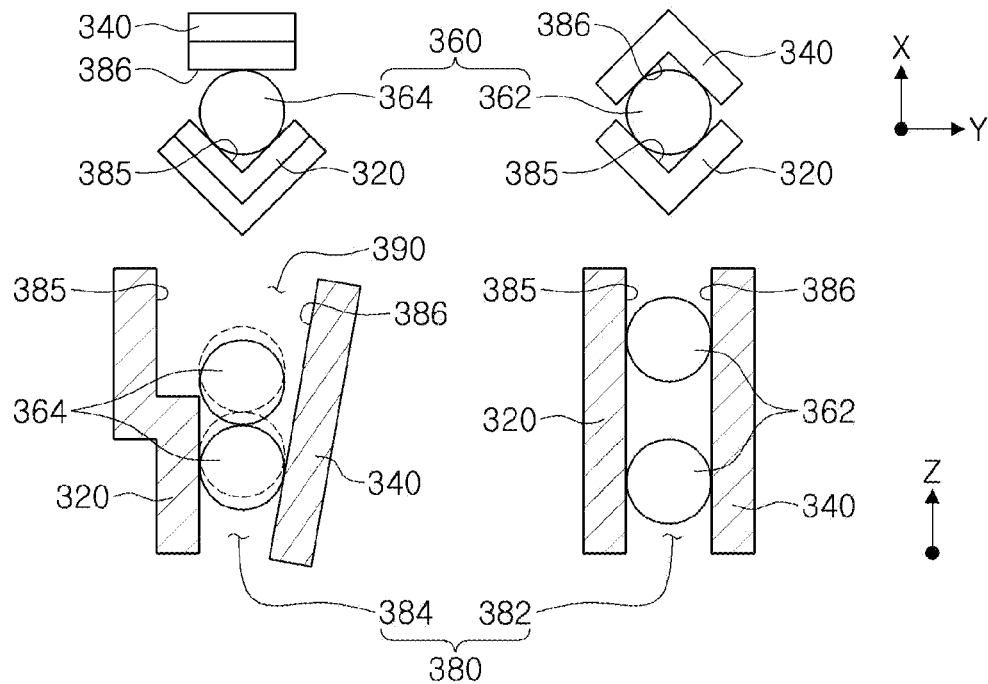
FIG. 6 is an explanatory diagram illustrating a second modified example of a ball rolling unit.

FIG. 6 is an explanatory diagram illustrating a second modified example of a ball rolling unit.

Referring to FIG. 6, a ball rolling unit 380 may include a main ball rolling unit 382 on which a main ball bearing 362 is installed, and an auxiliary ball rolling unit 384 on which an auxiliary ball bearing 364 is installed. In the ball rolling unit 380, in order to prevent a contact with at least one of the plurality of ball bearings 360, a contact avoidance unit 390 having a wider interval in one end portion in the optical axis direction (i.e., in the Z-axis direction) is formed. The contact avoiding unit 390 may be formed by a stepped surface and an inclined surface.

The ball rolling unit 380 may include a first ball support surface 385 provided in a housing 320, and a second ball support surface 386 disposed opposite to the first ball support surface 385 and provided in a driving body 340.

As an example, the first ball support surface 385 of the auxiliary ball rolling unit 384 is formed to be stepped so that an interval of the auxiliary ball rolling unit 384 with the second ball support surface 386 is increased in one end portion in the optical axis direction (i.e., the Z axis direction), and the second ball support surface 386 of the auxiliary ball rolling unit 384 is formed to be inclined so that an interval of the auxiliary ball rolling unit 384 with the first ball support surface 385 is increased from one end portion toward the other end portion in the optical axis direction (i.e., the Z axis direction).

As an example, the auxiliary ball bearing 364 contacts at two points on the first ball support surface 385 of the auxiliary ball rolling unit 384 and contacts at one point on the second ball support surface 386 of the auxiliary ball rolling unit 384. As an example, the first ball support surface 385 of the auxiliary ball rolling unit 384 may have a '/\' longitudinal cross-sectional shape and an angle therebetween of 90 degrees, and the second ball support surface 386 of the auxiliary ball rolling unit 384 may have a '-' longitudinal cross-sectional shape.

As an example, the main ball rolling unit 382 also includes a first ball support surface 385 and a second ball support surface 386, and the first ball support surface 385 and the first ball support surface 385 of the main ball rolling unit 382 have a '/\' longitudinal cross-sectional shape and an angle therebetween of 90 degrees. Accordingly, the main ball bearing 362 contacts the main ball rolling unit 382 at four points.

As described above, since the ball bearings 360 supported by the first and second ball support surfaces 385 and 386 can be deliberately determined, it is possible to stabilize the driving of the camera module 100 (see FIG. 1) according to the difference in disposition. In other words, since the ball bearing 360, in contact with the ball rolling unit 380, may not be changed according to the difference in disposition of the camera module 100, a tilt phenomenon occurring in the driving body 340 can be prevented.

Figure 7:
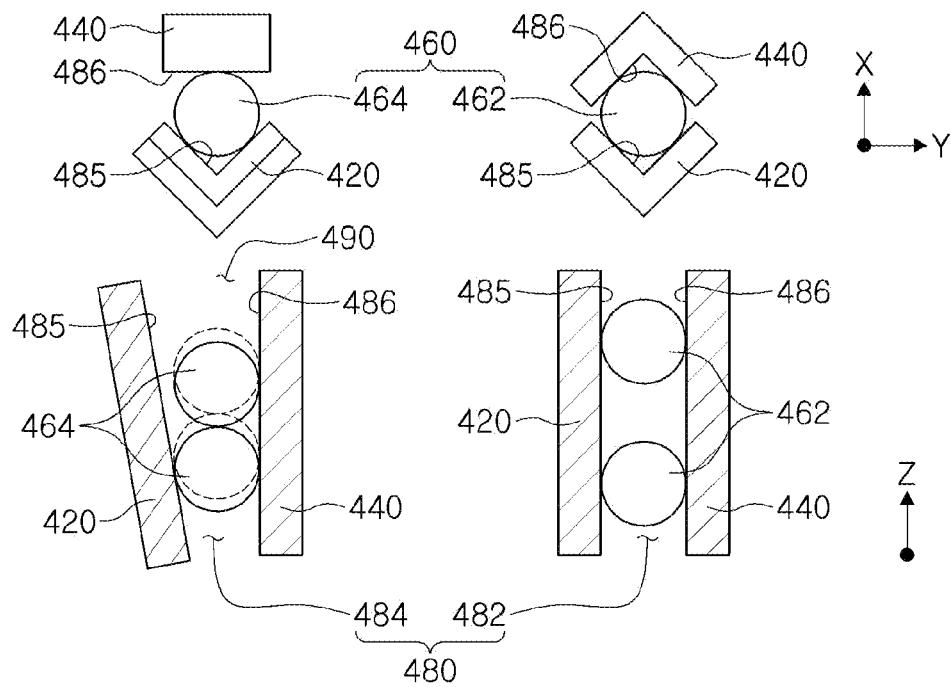
FIG. 7 is an explanatory diagram illustrating a third modified example of a ball rolling unit.

FIG. 7 is an explanatory diagram illustrating a third modified example of a ball rolling unit.

Referring to FIG. 7, a ball rolling unit 480 may include a main ball rolling unit 482 in which a main ball bearing 462 is installed, and an auxiliary ball rolling unit 484 in which the auxiliary ball bearing 464 is installed. In the ball rolling unit 480, a contact avoidance unit 490 having a wider interval in one end portion in the optical axis direction (i.e., the Z axis direction) is formed in order to prevent a contact with at least one of the plurality of ball bearings 460. The contact avoidance unit 490 may be formed by an inclined surface.

The ball rolling unit 480 may include a first ball support surface 485 provided in a housing 420, and a second ball support surface 486 disposed opposite to the first ball support surface 485 and provided in a driving body 440.

As an example, the first ball support surface 485 of the auxiliary ball rolling unit 484 is formed to be inclined so that an interval of the auxiliary ball rolling unit 484 with the second ball support surface 486 is increased from one end portion toward the other end portion in the optical axis direction (i.e., Z axis direction).

As an example, the auxiliary ball bearing 464 contacts at two points on the first ball support surface 485 of the auxiliary ball rolling unit 484 and contacts at one point on the second ball support surface 486 of the auxiliary ball rolling unit 484.

As an example, the first ball support surface 485 of the auxiliary ball rolling unit 484 may have a '/\' longitudinal sectional shape and an angle therebetween of 90 degrees, and the second ball support surface 486 of the auxiliary ball rolling unit 484 may have a '-' longitudinal sectional shape.

As an example, the main ball rolling unit 482 also includes a first ball support surface 485 and a second ball support surface 486, and the first ball support surface 485 and the first ball support surface 485 of the main ball rolling unit 482 have a '/\' longitudinal cross-sectional shape and an angle therebetween of 90 degrees. Accordingly, the main ball bearing 462 contacts the main ball rolling part 482 at four points.

Figure 8:
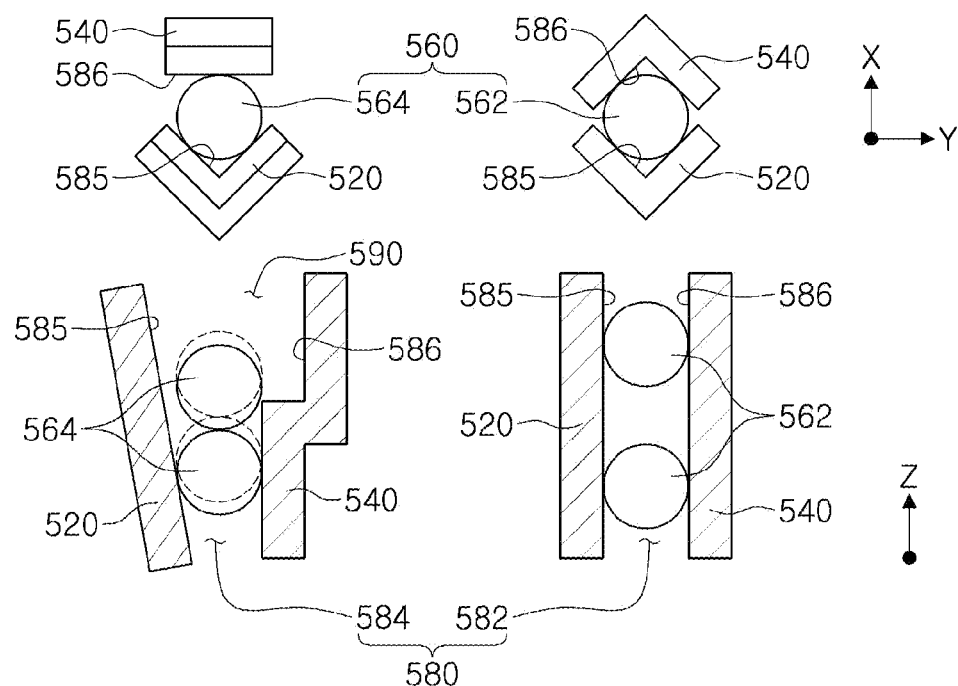
FIG. 8 is an explanatory diagram illustrating a fourth modified example of a ball rolling unit.

FIG. 8 is an explanatory diagram illustrating a fourth modified example of a ball rolling unit.

Referring to FIG. 8, the ball rolling unit 580 may include a main ball rolling unit 582 in which a main ball bearing 562 is installed, and an auxiliary ball rolling unit 584 in which the auxiliary ball bearing 564 is installed. In the ball rolling unit 580, a contact avoidance unit 590 having a wider interval in one end portion in the optical axis direction (i.e., the Z axis direction) is formed in order to prevent a contact with at least one of the plurality of ball bearings 560. The contact avoidance unit 590 may be formed by a stepped surface and an inclined surface.

The ball rolling unit 580 may include a first ball support surface 585 provided in a housing 520, and a second ball support surface 586 disposed opposite to the first ball support surface 585 and provided in a driving body 540.

As an example, the first ball support surface 585 of the auxiliary ball rolling unit 584 is formed to be inclined so that an interval of the auxiliary ball rolling unit 584 with the second ball support surface 586 is increased from one end portion toward the other end portion in the optical axis direction (i.e., Z axis direction), and the second ball support surface 586 of the auxiliary ball rolling unit 584 is formed to be stepped so that an interval of the auxiliary ball rolling unit 584 with the first ball support surface 585 is increased in one end portion in the optical axis direction (i.e., the Z axis direction).

As an example, the auxiliary ball bearing 564 contacts at two points on the first ball support surface 585 of the auxiliary ball rolling unit 584 and contacts at one point on the second ball support surface 586 of the auxiliary ball rolling unit 584. As an example, the first ball support surface 585 of the auxiliary ball rolling part 584 may have a '/\' longitudinal cross-sectional shape and an angle therebetween of 90 degrees, and the second ball support surface 586 of the auxiliary ball rolling part 584 may have a '-' longitudinal cross-sectional shape.

As an example, the main ball rolling unit 582 also includes a first ball support surface 585 and a second ball support surface 586, and the first ball support surface 585 and the first ball support surface 585 of the main ball rolling unit 582 have a '/\' longitudinal cross-sectional shape and an angle therebetween of 90 degrees. Accordingly, the main ball bearing 562 contacts the main ball rolling part 582 at four points.

Figure 9:
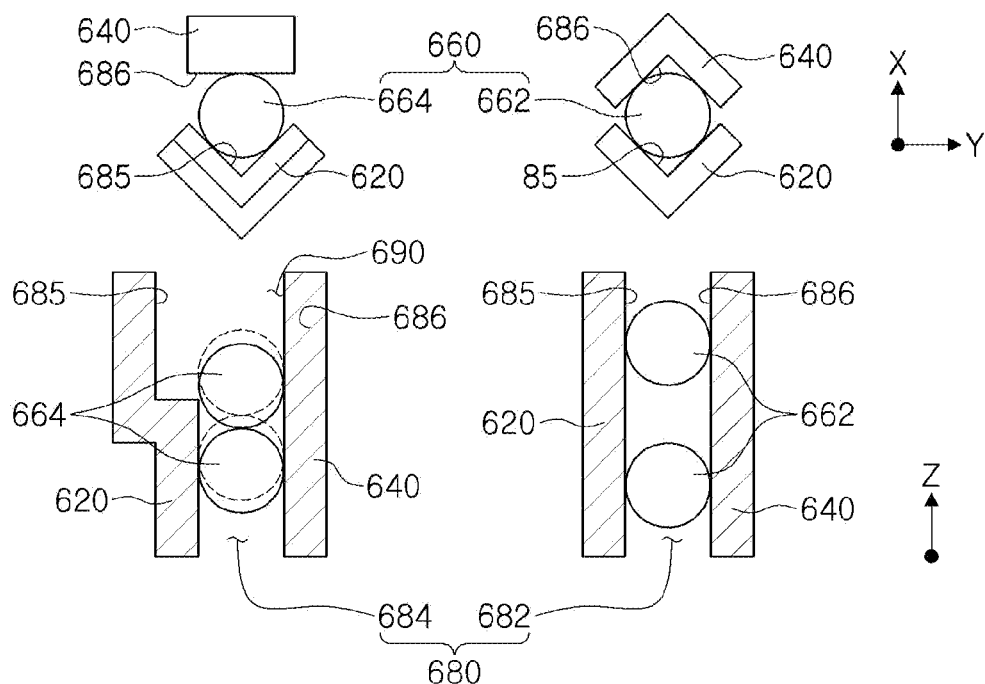
FIG. 9 is an explanatory diagram illustrating a fifth modified example of a ball rolling unit.

FIG. 9 is an explanatory diagram illustrating a fifth modified example of a ball rolling unit.

Referring to FIG. 9, the ball rolling unit 680 may include a main ball rolling unit 682 on which a main ball bearing 662 is installed, and an auxiliary ball rolling unit 684 on which the auxiliary ball bearing 664 is installed. In the ball rolling unit 680, a contact avoidance unit 690 having a wider interval in one end portion in the optical axis direction (i.e., the Z axis direction) is formed in order to prevent a contact with at least one of the plurality of ball bearings 660. The contact avoidance unit 690 may be formed by a stepped surface.

The ball rolling unit 680 may include a first ball support surface 685 provided in the housing 620 and a second ball support surface 686 disposed opposite to the first ball support surface 685 and provided in the driving body 640.

As an example, the first ball support surface 685 of the auxiliary ball rolling unit 684 is formed to be stepped so that an interval of the auxiliary ball rolling unit 684 with the second ball support surface 686 is increased in one end portion in the optical axis direction (i.e., the Z axis direction).

As an example, the auxiliary ball bearing 664 contacts at two points on the first ball support surface 685 of the auxiliary ball rolling unit 684 and contacts at one point on the second ball support surface 686 of the auxiliary ball rolling unit 684.

As an example, the first ball support surface 685 of the auxiliary ball rolling unit 684 may have a '/\' longitudinal cross-sectional shape and an angle therebetween of 90 degrees, and the second ball support surface 686 of the auxiliary ball rolling unit 684 may have a '-' longitudinal cross-sectional shape.

As an example, the main ball rolling unit 682 also includes a first ball support surface 685 and a second ball support surface 686, and the first ball support surface 685 and the first ball support surface 685 of the main ball rolling unit 682 have a '/\' longitudinal cross-sectional shape and an angle therebetween of 90 degrees. Accordingly, the main ball bearing 662 contacts the main ball rolling part 682 at four points.

Figure 10:
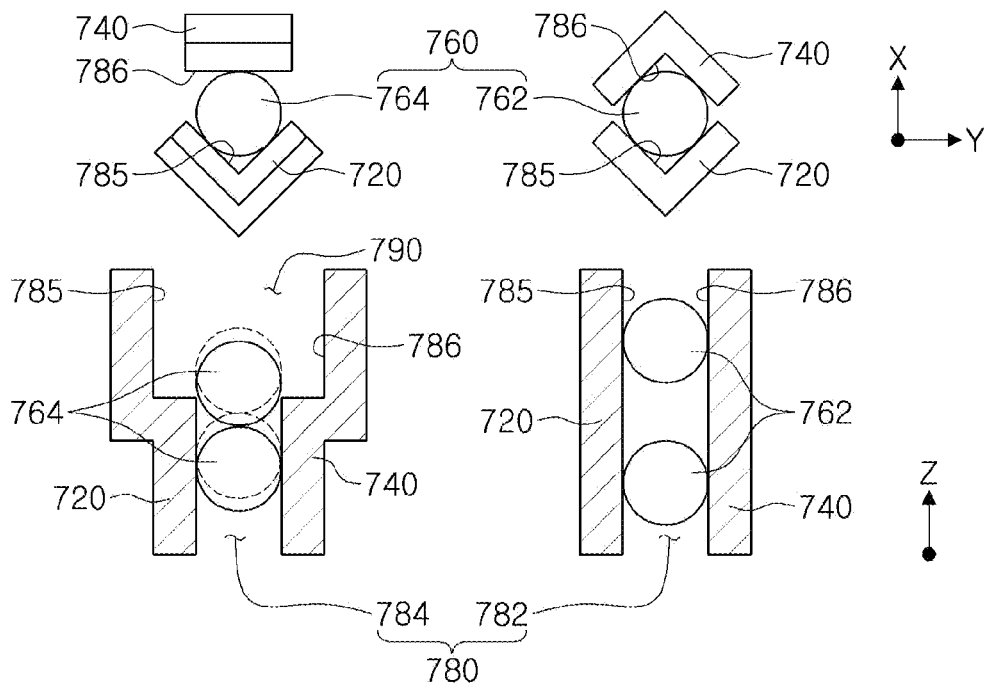
FIG. 10 is an explanatory diagram illustrating a sixth modified example of a ball rolling unit.

FIG. 10 is an explanatory diagram illustrating a sixth modified example of a ball rolling unit.

Referring to FIG. 10, a ball rolling unit 780 may include a main ball rolling unit 782 on which a main ball bearing 762 is installed, and an auxiliary ball rolling unit 784 on which an auxiliary ball bearing 764 is installed. In the ball rolling unit 780, in order to prevent contact with at least one of the plurality of ball bearings 760, a contact avoidance unit 790 having a wider interval in one end portion in the optical axis direction (i.e., the Z axis direction) is formed. The contact avoiding unit 790 may be formed by a stepped surface.

The ball rolling unit 780 may include a first ball support surface 785 provided in a housing 720, and a second ball support surface 786 disposed opposite to the first ball support surface 785 and provided in a driving body 740.

As an example, the first ball support surface 785 of the auxiliary ball rolling unit 784 is formed to be stepped so that an interval of the auxiliary ball rolling unit 784 with the second ball support surface 786 is increased in one end portion in the optical axis direction (i.e., the Z axis direction), and the second ball support surface 786 of the auxiliary ball rolling unit 784 is formed to be stepped so that an interval of the auxiliary ball rolling unit 784 with the first ball support surface 785 is increased in one end portion in the optical axis direction (i.e., the Z axis direction).

As an example, the auxiliary ball bearing 764 contacts at two points on the first ball support surface 785 of the auxiliary ball rolling unit 784 and contacts at one point on the second ball support surface 786 of the auxiliary ball rolling unit 784. As an example, the first ball support surface 785 of the auxiliary ball rolling unit 784 may have a '∧' longitudinal cross-sectional shape and an angle therebetween of 90 degrees, and the second ball support surface 786 of the auxiliary ball rolling unit 784 may have a '-' longitudinal cross-sectional shape.

As an example, the main ball rolling unit 782 also has a first ball support surface 785 and a second ball support surface 786, and the first ball support surface 785 and the first ball support surface 785 of the main ball rolling unit 782 has a '∧' longitudinal cross-sectional shape and an angle therebetween of 90 degrees. Accordingly, the main ball bearing 762 is in contact with the main ball rolling unit 782 at four points.

Figure 11:
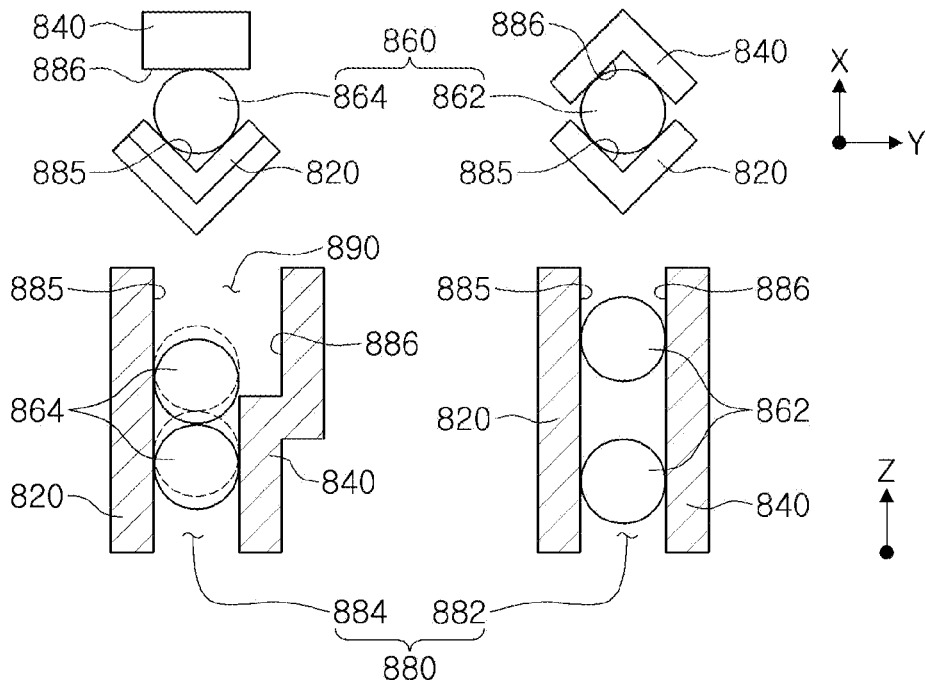
FIG. 11 is an explanatory diagram illustrating a seventh modified example of a ball rolling unit.

FIG. 11 is an explanatory diagram illustrating a seventh modified example of a ball rolling unit.

Referring to FIG. 11, a ball rolling unit 880 may include a main ball rolling unit 882 on which a main ball bearing 862 is installed and an auxiliary ball rolling unit 884 on which an auxiliary ball bearing 884 is installed. In the ball rolling unit 880, a contact avoidance unit 890 having a wider interval in one end portion in the optical axis direction (i.e., the Z axis direction) is formed in order to prevent contact with at least one of the plurality of ball bearings 860.

The ball rolling unit 880 may include a first ball support surface 885 provided in a housing 820 and a second ball support surface 886 disposed opposite to the first ball support surface 885 and provided in a driving body 840.

As an example, the second ball support surface 886 of the auxiliary ball rolling unit 884 is formed to be inclined so that an interval of the auxiliary ball rolling unit 884 with the first ball support surface 885 is increased from one end portion toward the other end portion in the optical axis direction (i.e., the Z axis direction).

As an example, the auxiliary ball bearing 864 contacts at one point on the first ball support surface 885 of the auxiliary ball rolling unit 884, and contacts at two points on the second ball support surface 886 of the auxiliary ball rolling unit 884.

As an example, the first ball support surface 885 of the auxiliary ball rolling unit 884 may have a '-' longitudinal cross-sectional shape, and the second ball support surface 886 of the auxiliary ball rolling unit 884 may have a '∧' longitudinal cross-sectional shape and an angle therebetween of 90 degrees.

As an example, the main ball rolling unit 882 also has a first ball support surface 885 and a second ball support surface 886, and the first ball support surface 885 and the second ball support surface 886 of the main ball rolling unit 882 have a '∧' longitudinal cross-sectional shape and an angle therebetween of 90 degrees. Accordingly, the main ball bearing 862 is in contact with the main ball rolling unit 882 at four points.

Figure 12:
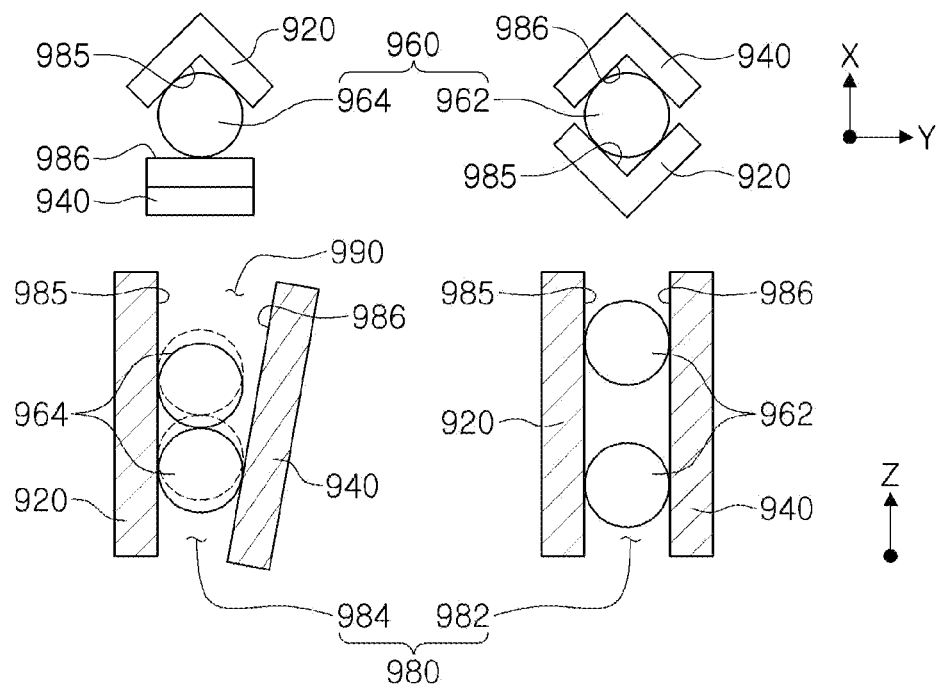
FIG. 12 is an explanatory diagram illustrating an eighth modified example of a ball rolling unit.

FIG. 12 is an explanatory diagram illustrating an eighth modified example of a ball rolling unit.

Referring to FIG. 12, a ball rolling unit 980 may include a main ball rolling unit 982 on which a main ball bearing 962 is installed and an auxiliary ball rolling unit 984 on which an auxiliary ball bearing 984 is installed. In the ball rolling unit 980, a contact avoidance unit 990 having a wider interval than in one end portion in the optical axis (i.e., the Z axis direction) is formed in order to prevent contact with at least one of the plurality of ball bearings 960.

The ball rolling unit 980 may include a first ball support surface 985 provided in a housing 920 and a second ball support surface 986 disposed opposite to the first ball support surface 985 and provided in a driving body 940.

As an example, the second ball support surface 986 of the auxiliary ball rolling unit 984 is formed to be inclined so that an interval of the auxiliary ball rolling unit 984 with the first ball support surface 985 is increased from one end portion toward the other end portion in the optical axis direction (i.e., the Z axis direction).

As an example, the auxiliary ball bearing 964 contacts at one point on the first ball support surface 985 of the auxiliary ball rolling unit 984, and contacts at two points on the second ball support surface 986 of the auxiliary ball rolling unit 984.

As an example, the first ball support surface 985 of the auxiliary ball rolling unit 984 may have a '-' longitudinal cross-sectional shape, and the second ball support surface 986 of the auxiliary ball rolling unit 984 may have a '∧' longitudinal cross-sectional shape and an angle therebetween of 90 degrees.

As an example, the main ball rolling unit 982 also has a first ball support surface 985 and a second ball support surface 986, and the first ball support surface 985 and the second ball support surface 986 of the main ball rolling unit 982 have a '∧' longitudinal cross-sectional shape and an angle therebetween of 90 degrees. Accordingly, the main ball bearing 962 is in contact with the main ball rolling unit 982 at four points.

Figure 13:
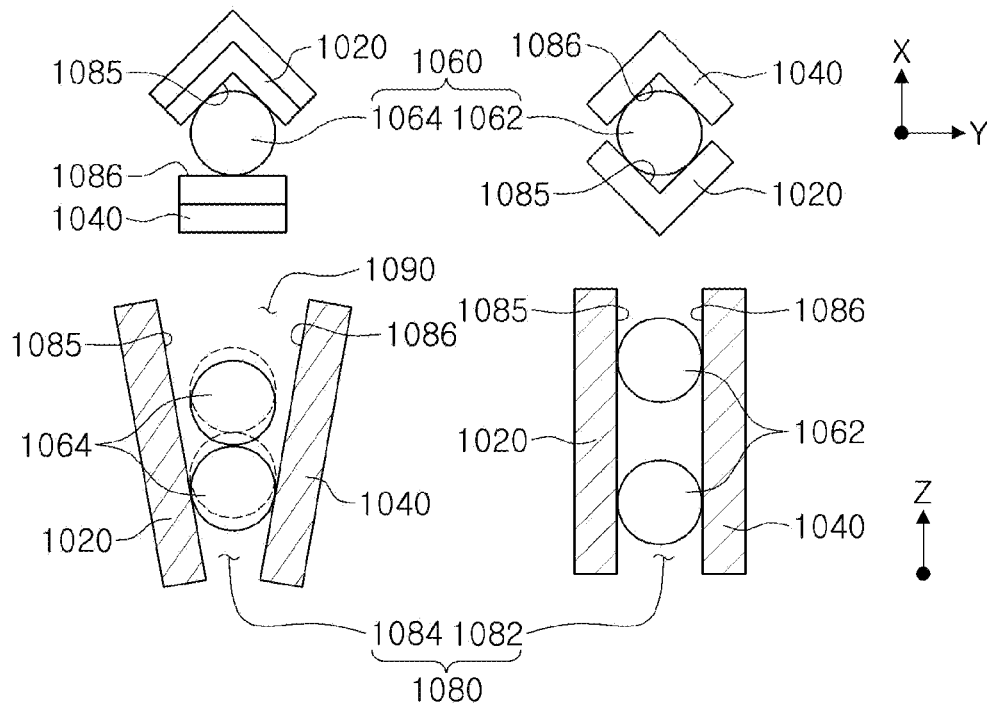
FIG. 13 is an explanatory diagram illustrating a ninth modified example of a ball rolling unit.

FIG. 13 is an explanatory diagram illustrating a ninth modified example of a ball rolling unit.

Referring to FIG. 13, a ball rolling unit 1080 may include a main ball rolling unit 1082 on which a main ball bearing 1062 is installed, and an auxiliary ball rolling unit 1084 on which an auxiliary ball bearing 1064 is installed. A contact avoidance unit 1090 having a wider interval in one end portion is formed in the ball rolling unit 1080 in the optical axis direction (i.e., the Z axis direction), in order to prevent contact with at least one of the plurality of ball bearings 1060. The contact avoidance unit 1090 may be formed by an inclined surface.

The ball rolling unit 1080 may include a first ball support surface 1085 provided in a housing 1020, and a second ball support surface 1086 disposed opposite to the first ball support surface 1085 and provided in a driving body 1040.

As an example, the first ball support surface 1085 of the auxiliary ball rolling unit 1084 is formed to be inclined so that an interval of the auxiliary ball rolling unit 1084 with the second ball support surface 1086 is increased from one end portion toward the other end portion in the optical axis direction (i.e., the Z axis direction), and the second ball support surface 1086 of the auxiliary ball rolling unit 1084 is formed to be inclined so that an interval of the auxiliary ball rolling unit 1084 with the first ball support surface 1085 is increased from one end portion toward the other end portion in the optical axis direction (i.e., the Z axis direction).

As an example, the auxiliary ball bearing 1064 contacts at one point on the first ball support surface 1085 of the auxiliary ball rolling unit 1084, and contacts at two points on the second ball support surface 1086 of the auxiliary ball rolling unit 1084. As an example, the first ball support surface 1085 of the auxiliary ball rolling unit 1084 may have a '-' longitudinal cross-sectional shape, and the second ball support surface 1086 of the auxiliary ball rolling unit 1084 may have a '/\' longitudinal cross-sectional shape and an angle therebetween of 90 degrees.

As an example, the main ball rolling unit 1082 also has a first ball support surface 1085 and a second ball support surface 1086, and the first ball support surface 1085 and the second ball support surface 1086 of the main ball rolling unit 1082 have a '/\' longitudinal cross-sectional shape and an angle therebetween of 90 degrees. Accordingly, the main ball bearing 1062 is in contact with the main ball rolling unit 1082 at four points.

Figure 14:
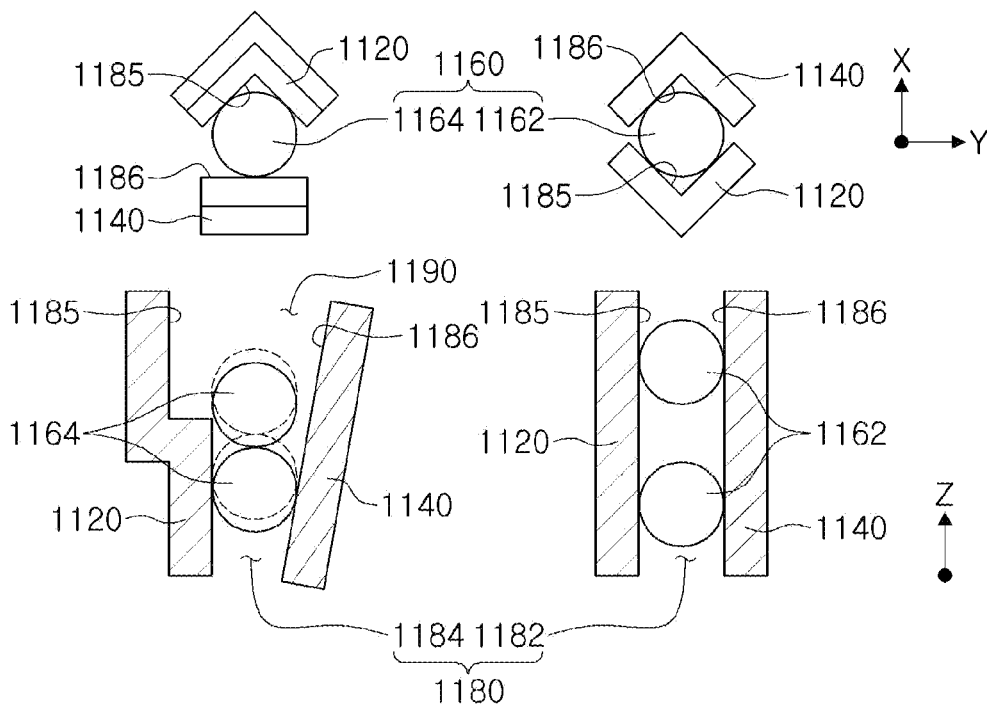
FIG. 14 is an explanatory diagram illustrating a tenth modified example of a ball rolling unit.

FIG. 14 is an explanatory diagram illustrating a tenth modified example of a ball rolling unit.

Referring to FIG. 14, a ball rolling unit 1180 may include a main ball rolling unit 1182 on which the main ball bearing 1162 is installed, and an auxiliary ball rolling unit 1184 on which the auxiliary ball bearing 1164 is installed. In the ball rolling unit 1180, a contact avoidance unit 1190 having a wider interval in one end portion in the optical axis direction (i.e., the Z axis direction) is formed to prevent contact with at least one of the plurality of ball bearings 1160.

The ball rolling unit 1180 may include a first ball support surface 1185 provided in a housing 1120 and a second ball support surface 1186 disposed opposite to the first ball support surface 1185 and provided in a driving body 1140.

As an example, the first ball support surface 1185 of the auxiliary ball rolling unit 1184 is formed to be stepped so that an interval of the auxiliary ball rolling unit 1184 with the second ball support surface 1186 is increased in one end portion in the optical axis direction (i.e., the Z axis direction), and the second ball support surface 1186 of the auxiliary ball rolling unit 1184 is formed so that an interval of the auxiliary ball rolling unit 1184 with the first ball support surface 1185 is increased from one end portion toward the other end portion in the optical axis direction (i.e., the Z axis direction).

As an example, the auxiliary ball rolling unit 1164 contacts at one point on the first ball support surface 1185 of the auxiliary ball rolling unit 1184 and contacts at two points on the second ball support surface 1186 of the auxiliary ball rolling unit 1184. As an example, the first support surface 1185 of the auxiliary ball rolling unit 1184 has a '/\' longitudinal cross-sectional shape, and the second support surface 1186 of the auxiliary ball rolling unit 1184 has a '/\' longitudinal cross-sectional shape and an angle therebetween of 90 degrees.

As an example, the main ball rolling unit 1182 also has a first ball support surface 1185 and a second ball support surface 1186, and the first ball support surface 1185 and the second ball support surface 1186 of the main ball rolling unit 1182 have a '/\' longitudinal cross-sectional shape and an angle therebetween of 90 degrees. Accordingly, the main ball bearing 1162 is in contact with the main ball rolling unit 1182 at four points.

Figure 15:
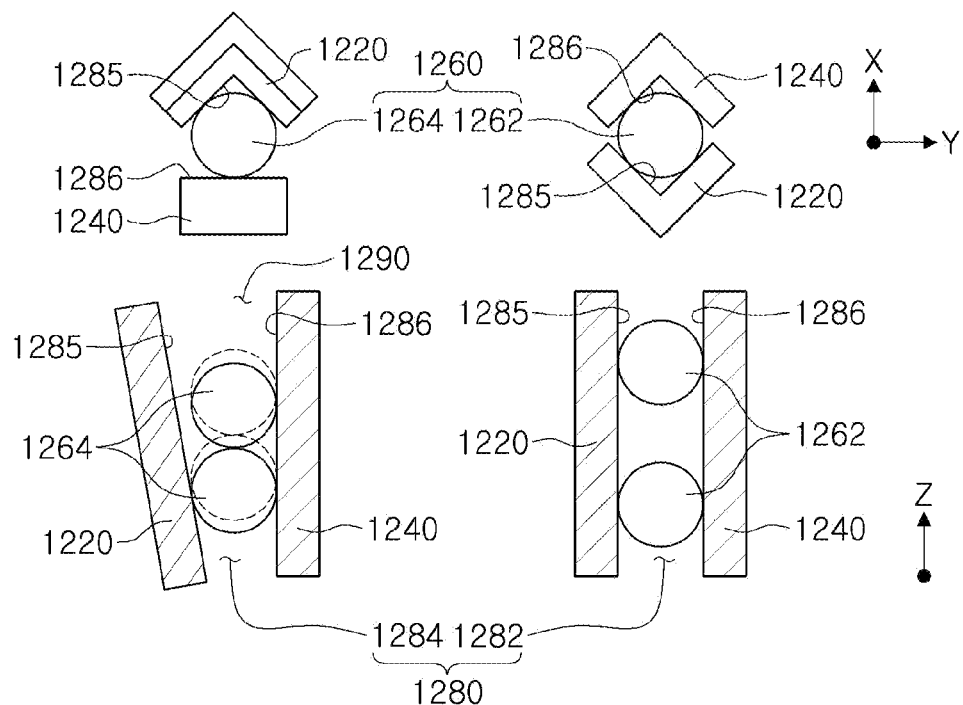
FIG. 15 is an explanatory diagram illustrating an eleventh modified example of a ball rolling unit.

FIG. 15 is an explanatory diagram illustrating an eleventh modified example of a ball rolling unit.

Referring to FIG. 15, a ball rolling unit 1280 may include a main ball rolling unit 1282 on which a main ball bearing 1262 is installed and an auxiliary ball rolling unit 1284 on which an auxiliary ball bearing 1264 is installed. In the ball rolling unit 1280, a contact avoidance unit 1290 having a wider interval in one end portion in the optical axis direction (i.e., the Z axis direction) is formed in order to prevent contact with at least one of the plurality of ball bearings 1260. The contact avoidance unit 1290 may be formed by an inclined surface.

The ball rolling unit 1280 may include a first ball support surface 1285 provided in a housing 1220, and a second ball support surface 1286 disposed opposite to the first ball support surface 1285 and provided in a driving body 1240.

As an example, the first ball support surface 1285 of the auxiliary ball rolling unit 1284 is formed to be inclined so that an interval of the auxiliary ball rolling unit 1284 with the second ball support surface 1286 is increased from one end portion toward the other end portion in the optical axis direction (i.e., the Z axis direction).

As an example, the auxiliary ball rolling unit 1264 contacts at one point on the first ball support surface 1285 of the auxiliary ball rolling unit 1284 and contacts at two points on the second ball support surface 1286 of the auxiliary ball rolling unit 1284.

As an example, the first ball support surface 1285 of the auxiliary ball rolling unit 1284 may have a '-' longitudinal cross-sectional shape, and the second ball support surface 1286 may have a '/\' longitudinal cross-sectional shape and an angle therebetween of 90 degrees.

As an example, the main ball rolling unit 1282 also has a first ball support surface 1285 and a second ball support surface 1286, and the first ball support surface 1185 and the second ball support surface 1286 of the main ball rolling unit 1282 have a '/\' longitudinal cross-sectional shape and an angle therebetween of 90 degrees. Accordingly, the main ball bearing 1262 is in contact with the main ball rolling unit 1282 at four points.

Figure 16:
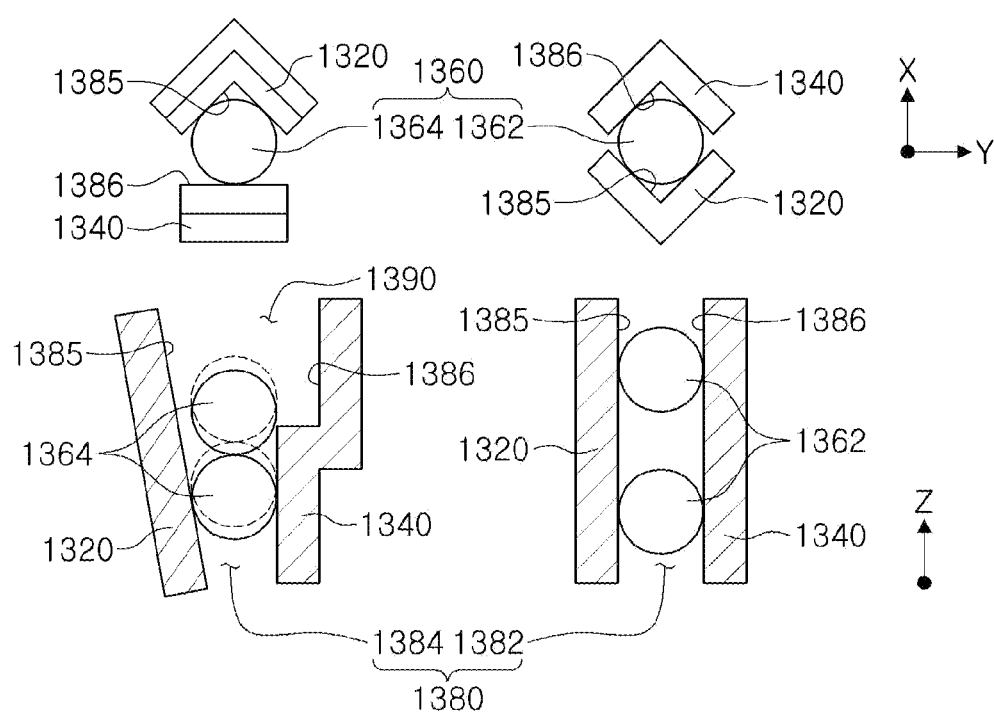
FIG. 16 is an explanatory diagram illustrating a twelfth modified example of a ball rolling unit.

FIG. 16 is an explanatory diagram illustrating a twelfth modified example of a ball rolling unit.

Referring to FIG. 16, a ball rolling unit 1380 may include a main ball rolling unit 1382 on which a main ball bearing 1362 is installed, and an auxiliary ball rolling unit 1384 on which an auxiliary ball bearing 1364 is installed.

In the ball rolling unit 1380, a contact avoidance unit 1390 having a wider interval in one end portion in the optical axis direction (i.e., the Z axis direction) is formed in order to prevent contact with at least one of the plurality of ball bearings 1360.

The ball rolling unit 1380 may include a first ball support surface 1385 provided in a housing 1320, and a second ball support surface 1386 disposed opposite to the first ball support surface 1385 and provided in a driving body 1340.

As an example, the first ball support surface 1385 of the auxiliary ball rolling unit 1384 is formed to be inclined so that an interval of the auxiliary ball rolling unit 1384 with the second ball support surface 1386 widens from one end portion toward the other end portion in the optical axis direction (the Z axis direction), and the second ball support surface 1386 of the auxiliary ball rolling unit 1384 is formed to be stepped so that an interval of the auxiliary ball rolling unit 1384 with the first ball rolling unit 1384 widens in one end portion in the optical axis direction (i.e., the Z axis direction).

As an example, the auxiliary ball bearing 1364 contacts at one point on the first ball support surface 1385 of the auxiliary ball rolling unit 1384 and contacts at two points on the second ball support surface 1386 of the auxiliary ball rolling unit 1384.

As an example, the first ball support surface 1385 of the auxiliary ball rolling unit 1384 may have a '-' longitudinal cross-sectional shape, and the second ball support surface 1386 of the auxiliary ball rolling unit 1384 may have a '∧' longitudinal cross-sectional shape, and an angle therebetween of 90 degrees.

As an example, the main ball rolling unit 1382 also has a first ball support surface 1385 and a second ball support surface 1386, and the first ball support surface 1385 and the second ball support surface 1386 of the main ball rolling unit 1382 has a '∧' longitudinal cross-sectional shape and an angle therebetween of 90 degrees. Accordingly, the main ball bearing 1362 contacts the main ball rolling part 1382 at four points.

Figure 17:
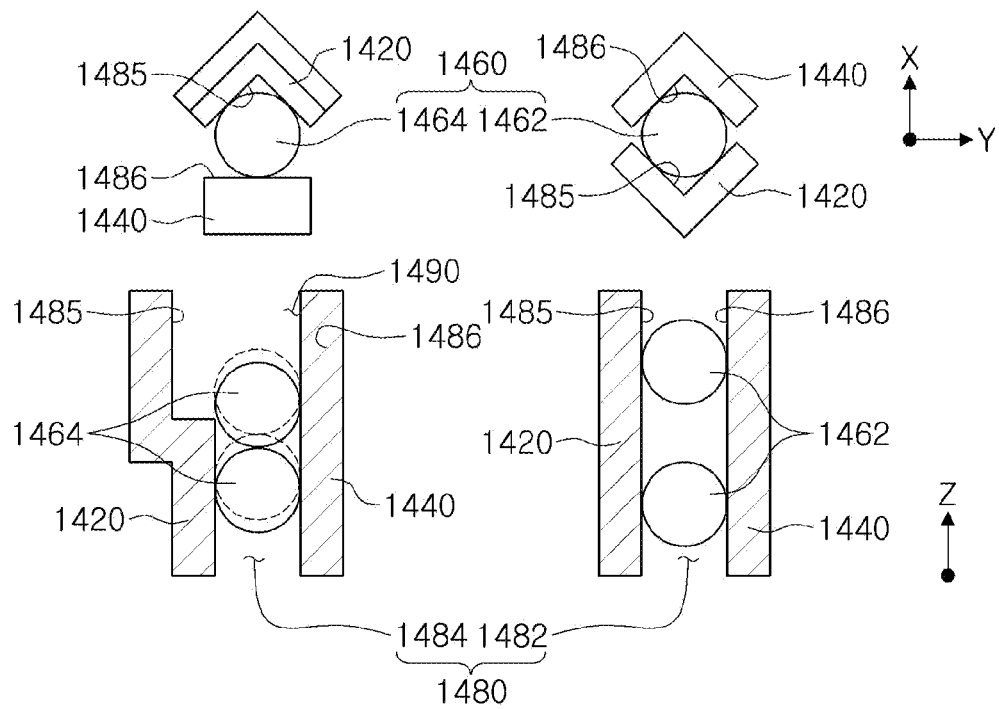
FIG. 17 is an explanatory diagram illustrating a thirteenth modified example of a ball rolling unit.

FIG. 17 is an explanatory diagram illustrating a thirteenth modified example of a ball rolling unit.

Referring to FIG. 17, a ball rolling unit 1480 may include a main ball rolling unit 1482 on which a main ball bearing 1462 is installed, and an auxiliary ball rolling unit 1484 on which the auxiliary ball bearing 1464 is installed.

In the ball rolling unit 1480, a contact avoidance unit 1490 having a wider interval at one end portion in the optical axis direction (that is, Z axis direction) is formed in order to prevent a contact with at least one of the plurality of ball bearings 1460. The contact avoidance unit 1490 may be formed by a stepped surface.

The ball rolling unit 1480 may include a first ball support surface 1485 provided in a housing 1420, and a second ball support surface 1486 disposed opposite to the first ball support surface 1485 and provided in a driving body 1440.

As an example, the first ball support surface 1485 of the auxiliary ball rolling unit 1484 is formed to be stepped so that an interval of the auxiliary ball rolling unit 1484 with the second ball support surface 1486 is increased in one end portion in the optical axis direction (the Z axis direction).

As an example, the auxiliary ball bearing 1464 contacts at one point on the first ball support surface 1485 of the auxiliary ball rolling unit 1484 and contacts at two points on the second ball support surface 1486 of the auxiliary ball rolling unit 1484.

As an example, the first ball support surface 1485 of the auxiliary ball rolling unit 1484 may have a '-' longitudinal cross-sectional shape, and the second ball support surface 1486 of the auxiliary ball rolling unit 1484 may have a '∧' longitudinal cross-sectional shape, and an angle therebetween of 90 degrees.

As an example, the main ball rolling unit 1482 also has a first ball support surface 1485 and a second ball support surface 1486, and the first ball support surface 1485 and the second ball support surface 1486 of the main ball rolling unit 1482 has a '∧' longitudinal cross-sectional shape and an angle therebetween of 90 degrees. Accordingly, the main ball bearing 1462 contacts the main ball rolling part 1482 at four points.

Figure 18:
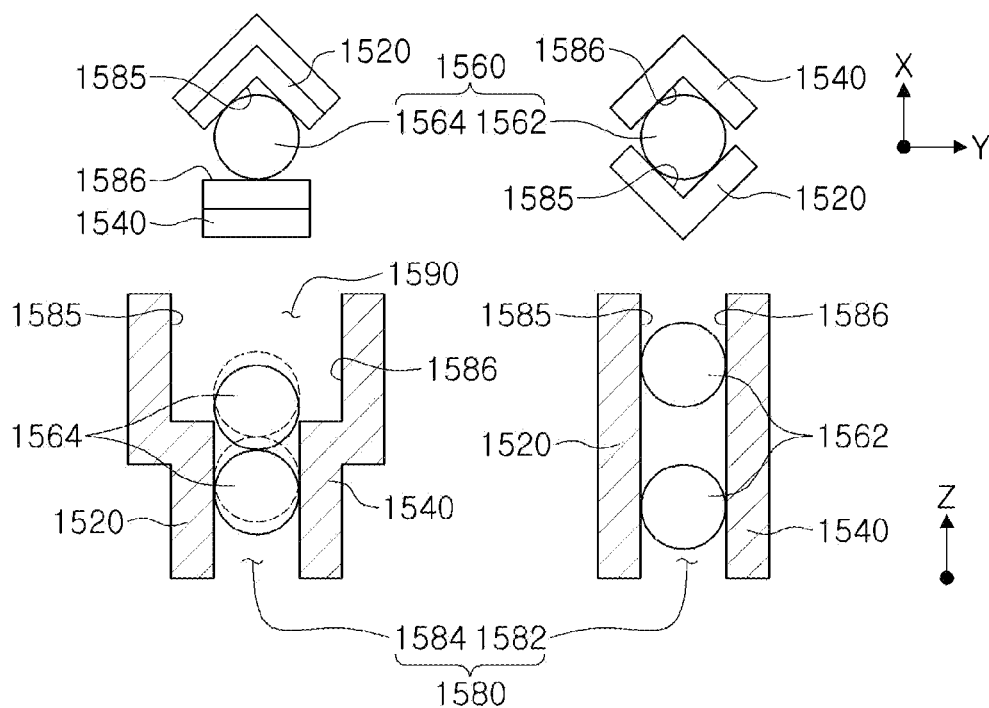
FIG. 18 is an explanatory diagram illustrating a fourteenth modified example of a ball rolling unit.

FIG. 18 is an explanatory diagram illustrating a fourteenth modified example of a ball rolling unit.

Referring to FIG. 18, a ball rolling unit 1580 may include a main ball rolling unit 1582 in which a main ball bearing 1562 is installed, and an auxiliary ball rolling unit 1584 in which an auxiliary ball bearing 1564 is installed. A contact avoidance unit 1590 having a wider gap at one end portion in the optical axis direction (i.e., Z-axis direction) is formed to prevent a contact with at least one of the plurality of ball bearings 1560. The contact avoidance unit 1590 may be formed by a stepped surface.

The ball rolling unit 1580 may include a first ball support surface 1585 provided in the housing 1520, and a second ball support surface 1586 disposed opposite to the first ball support surface 1585 and provided in a driving body 1540.

As an example, the first ball support surface 1585 of the auxiliary ball rolling unit 1584 is formed stepped to widen an interval, with the second ball support surface 1586 of the auxiliary ball rolling unit 1584 at one end portion in the optical axis direction (i.e., the Z-axis direction), and the second ball support surface 1586 is formed to be stepped to widen an interval, with the first ball support surface 1585 of the auxiliary ball rolling unit 1584 at the other end portion in the optical axis direction (i.e., the Z-axis direction).

As an example, the auxiliary ball bearing 1564 contacts at one point on the first ball support surface 1585 of the auxiliary ball rolling unit 1584, and contacts at two points on the second ball support surface 1586 of the auxiliary ball rolling unit 1584.

As an example, the first ball support surface 1585 of the auxiliary ball rolling unit 1584 may have a '-' longitudinal cross-sectional shape, and the second ball support surface 1586 of the auxiliary ball rolling unit 1584 may have a '∧' longitudinal cross-sectional shape and an angle therebetween of 90 degrees.

As an example, the main ball rolling unit 1582 may also have a first ball support surface 1585 and a second ball support surface 1586, and the first ball support surface 1585 and the first ball support surface 1585 of the main ball rolling unit 1582 has a '∧' longitudinal cross-sectional shape and an angle of 90 degrees therebetween. Accordingly, the main ball bearing 1562 is in contact with the main ball rolling unit 1582 at four points.

Figure 19:
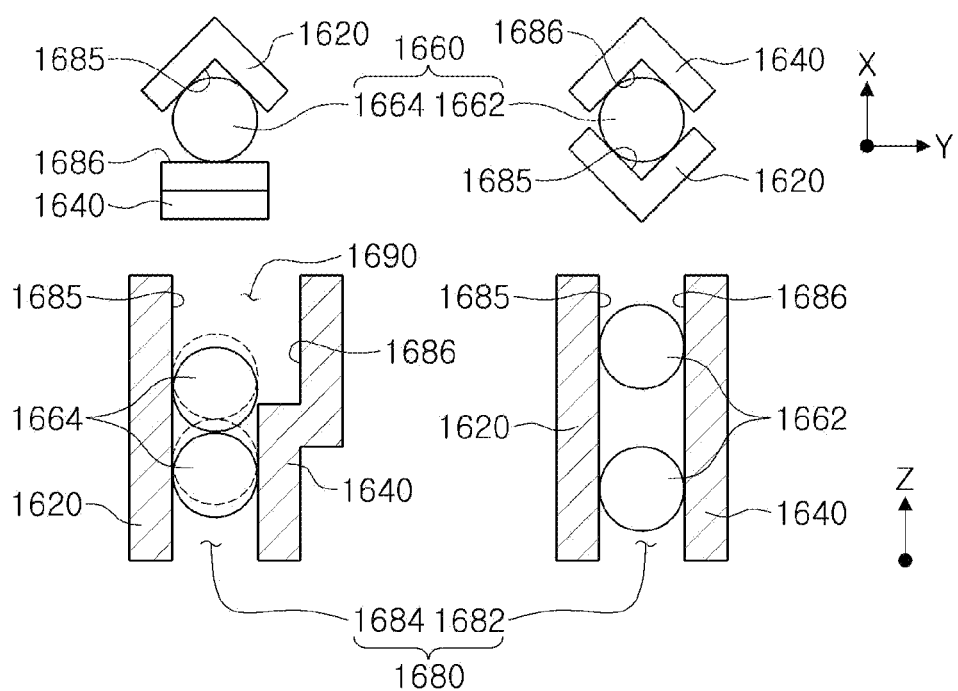
FIG. 19 is an explanatory diagram illustrating a fifteenth modified example of a ball rolling unit.

FIG. 19 is an explanatory diagram illustrating a fifteenth modified example of a ball rolling unit.

Referring to FIG. 19, a ball rolling unit 1680 may include a main ball rolling unit 1682 on which a main ball bearing 1662 is installed, and an auxiliary ball rolling unit 1684 on which an auxiliary ball bearing 1664 is installed. In the ball rolling unit 1680, a contact avoidance unit 1690 having a wider interval at one end portion in the optical axis direction (i.e., in the Z-axis direction) is formed to prevent a contact with at least one of the plurality of ball bearings 1660. The contact avoidance unit 1690 may be formed by a stepped surface.

The ball rolling unit 1680 may include a first ball support surface 1685 provided in the housing 1620, and a second ball support surface 1686 disposed opposite to the first ball support surface 1685 and provided in a driving body 1640.

As an example, the second ball support surface 1686 of the auxiliary ball rolling unit 1684 is formed to be stepped so that an interval with the first ball support surface 1685 of the auxiliary ball rolling unit 1684 is widened at the other end portion in the optical axis direction (i.e., the Z-axis direction).

As an example, the auxiliary ball bearing 1664 contacts at one point on the first ball support surface 1685 of the auxiliary ball rolling unit 1684, and contacts at two points on the second ball support surface 1686 of the auxiliary ball rolling unit 1684.

As an example, the first ball support surface 1685 of the auxiliary ball rolling unit 1684 may have a '-' longitudinal cross-sectional shape, and the second ball support surface 1686 of the auxiliary ball rolling unit 1684 may have a '∧' longitudinal cross-sectional shape and an angle therebetween of 90 degrees.

As an example, the main ball rolling part 1682 may also have a first ball support surface 1685 and a second ball support surface 1686, and the first ball support surface 1685 and the first ball support surface 1685 of the main ball rolling unit 1682 may have a '∧' longitudinal cross-sectional shape and an angle of 90 degrees therebetween.

Accordingly, the main ball bearing 1662 is in contact with the main ball rolling unit 1682 at four points.

Meanwhile, in the above-described embodiment, a case in which the first ball support surface and the second ball support surface of the main ball rolling unit have a '∧' longitudinal cross-sectional shape and an angle therebetween of 90 degrees, the first ball support surface of the auxiliary ball rolling unit has a '∧' longitudinal cross-sectional shape and an angle therebetween of 90 degrees, and the second ball support surface of the auxiliary ball rolling unit has a '∧' longitudinal cross-sectional shape and an angle therebetween of 90 degrees, or a case in which the first ball support surface and the second ball support surface of the main ball rolling unit have a '∧' longitudinal cross-sectional shape and an angle therebetween of 90 degrees, the first ball support surface of the auxiliary ball rolling unit has a '∧' longitudinal cross-sectional shape and an angle therebetween of 90 degrees, and the second ball support surface of the auxiliary ball rolling unit has a '∧' longitudinal cross-sectional shape and an angle therebetween of 90 degrees, is illustrated as an example, but is not limited thereto.

That is, any one of the longitudinal cross-sections of the first ball support surface and the second ball support surface of the main ball rolling unit may have a '-' shape, and the longitudinal cross-sections of the first ball support surface and the second ball support surface of the auxiliary ball rolling unit may have a '∧' shape and an angle therebetween of 90 degrees.

Hereinafter, a method of measuring an inclination and a step of a first ball support surface of a main rolling unit and an auxiliary rolling unit forming a ball rolling unit will be described.

Figure 20:
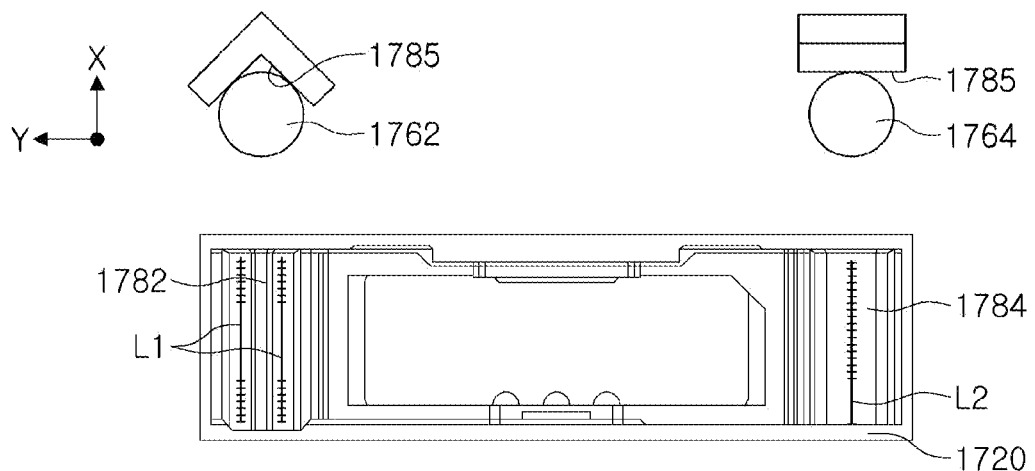
FIG. 20 is an explanatory diagram illustrating a method of measuring an inclination of a first ball support surface of a main ball rolling unit and an auxiliary ball rolling unit.

FIG. 20 is an explanatory diagram illustrating a method of measuring an inclination of a first ball support surface of a main ball rolling unit and an auxiliary ball rolling unit.

Referring to FIG. 20, first, a first ball support surface 1785 forming a main ball rolling unit 1782 has a '∧' longitudinal cross-sectional shape, and a first ball support surface 1785 forming an auxiliary ball rolling unit 1784 has a '-' longitudinal cross-sectional shape.

Here, in a method of measuring an inclination of a first ball support surface of a main ball rolling unit and an auxiliary ball rolling unit, first, when a bottom surface of a housing 1720, a reference plane, is seated in a measuring device, the bottom surface of the housing 1720 is set as an origin point. In this case, the origin point is configured to be set as an origin point for the first ball support surface 1785 of the main ball rolling unit 1782, and an origin point for the first ball support surface 1785 of the auxiliary ball rolling unit 1784, respectively.

In order to measure an inclination angle of the main ball rolling unit 1782 with respect to the first support surface 1785, first, two first contact lines L1 connecting a point at which a main ball bearing 1762 is in contact with the first support surface 1785 are set as shown in FIG. 20. A length in a Z-axis direction from the origin point is measured at an interval of 0.1 mm in a Z-axis direction, an optical axis direction, along the first contact line L1. An inclination angle is calculated using coordinates from the origin point to each measurement point. In other words, verticality of two facing surfaces having a '∧' longitudinal cross-sectional shape is detected. In this case, when an inclination thereof is 0, the two surfaces of the first support surface 1785 are disposed to be perpendicular to the bottom surface. As described above, the measured inclination angle of the first support surface 1785 of the main ball rolling unit 1782 may be within ±8.0'. In this case, 1° is 60'.

Next, in order to measure an inclination angle of the auxiliary ball rolling unit 1784 with respect to the first support surface 1785, one second contact line L2 connecting a point at which an auxiliary ball bearing 1764 is in contact with the first support surface 1785 is set as shown in FIG. 20. A length in a Z-axis direction from an origin point is measured at an interval of 0.1 mm in a Z-axis direction, an optical axis, along the second contact line L2. The inclination angle is calculated using coordinates from the origin point to each measurement point. In other words, verticality of a first support surface 1785 having a '-' longitudinal cross-sectional shape is detected. In this case, when an inclination thereof is 0, the first support surface 1785 is disposed to be perpendicular to the bottom surface. As described above, the measured inclination angle of the first support surface 1785 of the auxiliary ball rolling unit 1784 may have a value of between 8.0' and −23'. Here, the − direction means a direction away from a ball bearing, which is a direction not in contact with the ball bearing.

Figure 21:
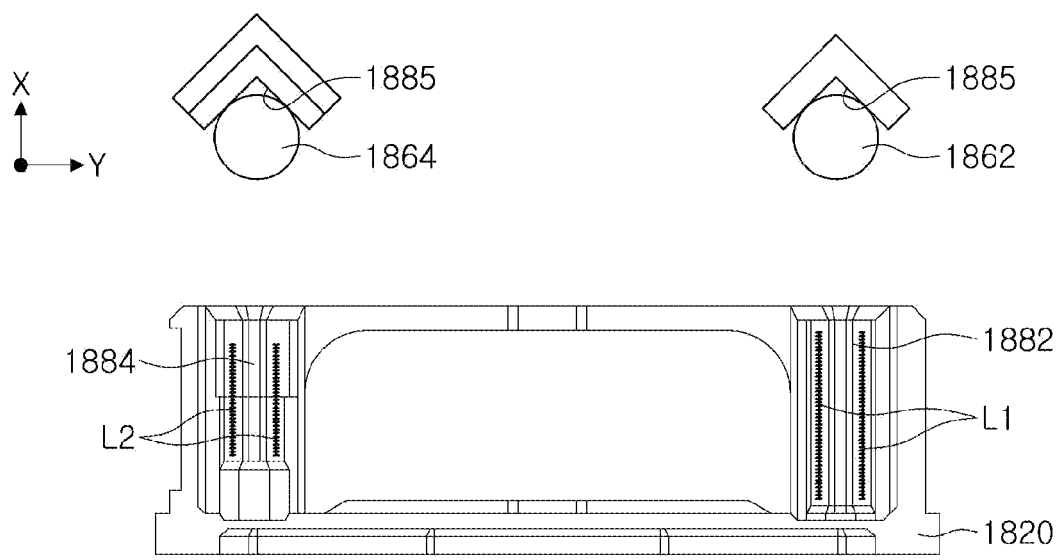
FIG. 21 is an explanatory diagram illustrating a method of measuring an inclination and a step of a first ball support surface of a main ball rolling unit and an auxiliary ball rolling unit.
Figure 22:
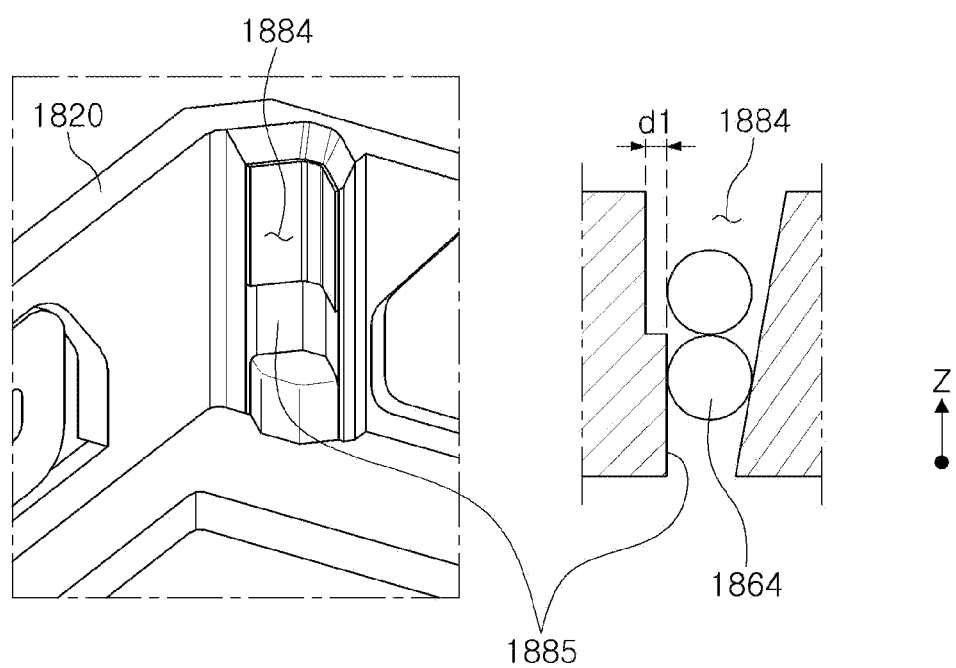
FIG. 22 is an explanatory diagram illustrating a first ball support surface of an auxiliary ball rolling unit.

FIG. 21 is an explanatory diagram illustrating a method of measuring an inclination and a step of a first ball support surface of a main ball rolling unit and an auxiliary ball rolling unit, and FIG. 22 is an explanatory diagram illustrating a first ball support surface of an auxiliary ball rolling unit.

Referring to FIGS. 21 and 22, first, a first ball support surface 1885 forming a main ball rolling unit 1882 has a '∧' longitudinal cross-sectional shape, and a first ball support surface 1885 forming an auxiliary ball rolling unit 1884 has a '∧' longitudinal cross-sectional shape.

Here, in a method of measuring an inclination of the first ball support surface 1885 of the main ball rolling unit 1882, first, when a bottom surface of a housing 1820, a reference surface, is seated in a measuring device, the bottom surface of the housing 1820 set as an origin point. In this case, the origin point is configured to be set as an origin point of the main ball rolling unit 1882 with respect to the ball support surface 1885 and an origin point of the auxiliary ball rolling unit 1884 with respect to the first ball support surface 1885, respectively.

In order to measure an inclination angle of the main ball rolling unit 1882 with respect to the first support surface 1885, first, two first contact lines L1 connecting a point at which a main ball bearing 1862 is in contact with the first support surface 1885 are set as shown in FIG. 21. A length in a Z-axis direction from the origin point is measured at an interval of 0.1 mm in a Z-axis direction, an optical axis, along the first contact line L1. The inclination angle is calculated using coordinates from the origin point to each measurement point. In other words, verticality of two facing surfaces having a '∧' longitudinal cross-sectional shape is detected. In this case, when an inclination thereof is 0, two surfaces of the first support surface 1885 are disposed to be perpendicular to the bottom surface. As described above, the measured inclination angle of the first support surface 1885 of the main ball rolling unit 1882 may be within ±8.0'. In this case, 1° is 60'.

As illustrated in FIG. 22, the first ball support surface 1885 of the auxiliary ball rolling unit 1884 may be formed to be stepped. In order to measure a step d1 of a stepped surface as described above, two second contact lines L2 connecting a point at which an auxiliary ball bearing 1864 is in contact with the first support surface 1885 are set as shown in FIG. 21. A length in a Z-axis direction from the origin point is measured at an interval of 0.1 mm in a Z-axis direction, an optical axis, along the second contact line L2. A step is calculated using coordinates of the origin point and each measurement point. As described above, the step d1 of the measured stepped surface may have a value of between 0.01 mm and 0.02 mm.

Meanwhile, when the ball support surface (i.e., the first ball support surface and/or the second ball support surface) is formed to be inclined in the first example embodiment and modified example embodiments of the above-described ball rolling units, an inclination angle of the ball support surface may have a value of between −8.0' and −23', and when the ball support surface (i.e., the first ball support surface and/or the second ball support surface) is formed to be stepped in the first example embodiment and modified example embodiments, a step of a stepped surface of the ball support surface may have a value of between 0.01 mm and 0.02 mm. When the ball support surface (i.e., the first ball support surface and/or the second ball support surface) in the first example embodiment and modified example embodiments of the above-described ball rolling units is disposed perpendicular to the bottom surface, the inclination angle of the ball support surface may be within ±8.0'.

As set forth above, according to the various examples, there is an effect of preventing a tilt from occurring in a driving body.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing comprising a first ball support surface disposed on an inner surface thereof;
   a driving body movably disposed in the housing and comprising a second ball support surface disposed on an outer surface thereof; and
   a plurality of ball bearings disposed between the first ball support surface of the housing and the second ball support surface of the driving body,
   a distance between the first ball support surface and the second ball support surface along a direction perpendicular to an optical axis direction is different at respective first end portions of the first ball support surface and the second ball support surface in the optical axis direction than at respective second end portions of the first ball support surface and the second ball support surface in the optical axis direction.

2. The camera module of claim 1, wherein the second ball support surface is inclined in the optical axis direction.

3. The camera module of claim 2, wherein an inclination angle of the second ball support surface is within ±8.0'.

4. The camera module of claim 2, wherein the first ball support surface is inclined in the optical axis direction.

5. The camera module of claim 4, wherein an inclination angle of the first ball support surface is within ±8.0'.

6. The camera module of claim 2, wherein the first ball support surface is stepped in the optical axis direction.

7. The camera module of claim 6, wherein a step between stepped surfaces of the first ball support surface has a value of between 0.01 mm and 0.02 mm.

8. The camera module of claim 1, wherein the first ball support surface is stepped in the optical axis direction.

9. The camera module of claim 8, wherein an inclination angle of the first ball support surface is within ±8.0'.

10. The camera module of claim 8, wherein the second ball support surface is stepped in the optical axis direction.

11. The camera module of claim 10, wherein a step between stepped surfaces of the second ball support surface has a value of between 0.01 mm and 0.02 mm.

12. The camera module of claim 1, wherein the first ball support surface is stepped in the optical axis direction.

13. The camera module of claim 12, wherein a step between stepped surfaces of the first ball support surface has a value of between 0.01 mm and 0.02 mm.

14. The camera module of claim 12, wherein the second ball support surface is stepped in the optical axis direction.

15. The camera module of claim 14, wherein a step between stepped surfaces of the second ball support surface has a value of between 0.01 mm and 0.02 mm.

16. The camera module of claim 1, wherein the second ball support surface is stepped in the optical axis direction.

17. The camera module of claim 16, wherein a step between stepped surfaces of the second ball support surface has a value of between 0.01 mm and 0.02 mm.

18. The camera module of claim 1, wherein the first ball support surface comprises a first main ball support surface and a first auxiliary ball support surface spaced apart from the first main ball support surface,
   wherein the second ball support surface comprises a second main ball support surface disposed opposite the first main ball support surface to define a main rolling space and a second auxiliary ball support surface disposed opposite the first auxiliary ball support surface to define an auxiliary rolling space, and
   wherein the plurality of ball bearings comprises a main ball bearing disposed in the main rolling space, and an auxiliary ball bearing disposed in the auxiliary rolling space.

19. The camera module of claim 18, wherein the auxiliary ball bearing comprises a plurality of auxiliary ball bearings, and at least two of the auxiliary ball bearings are each in contact with the first auxiliary ball support surface and the second auxiliary ball support surface at three points.

20. The camera module of claim 19, wherein the at least two auxiliary ball bearings each contact the first auxiliary ball support surface at one point, and contact the second auxiliary ball support surface at two points.

21. The camera module of claim 19, wherein the at least two auxiliary ball bearings each contact the first auxiliary ball support surface at two points, and contact the second auxiliary ball support surface at one point.

22. The camera module of claim 18, wherein the main ball bearing comprise a plurality of main ball bearings, and at least two of the main ball bearings are each in contact with the first main ball support surface and the second main ball support surface at four points.

23. The camera module of claim 18, wherein the first ball support surface and the second ball support surface forming the main ball rolling unit has a '/\' longitudinal cross-sectional shape, wherein an inclination angle of the first ball support surface and the second ball support surface forming the main ball rolling unit is within ±8.0'.

24. The camera module of claim 18, wherein the first ball support surface or the second ball support surface forming the auxiliary ball rolling unit has a '-' longitudinal cross-sectional shape, wherein an inclination angle of the first ball support surface or the second ball support surface forming the auxiliary ball rolling unit has a value of between −8.0' and −23'.

25. The camera module of claim 23, wherein the first ball support surface forming the auxiliary ball rolling unit has a '/\' longitudinal cross-sectional shape,
   wherein, when the first ball support surface forming the auxiliary ball rolling unit is formed to be stepped, a step between stepped surfaces of the first ball support surface forming the auxiliary ball rolling unit has a value of between 0.01 mm and 0.02 mm.

* * * * *